US012777362B2

(12) United States Patent
Rossbach et al.

(10) Patent No.: US 12,777,362 B2
(45) Date of Patent: Oct. 27, 2026

(54) SYSTEMS, METHODS, AND DEVICES FOR OUT-OF-ORDER DELIVERY WITH MULTIPLE RLC ENTITIES

(71) Applicant: Apple Inc., Cupertino, CA (US)

(72) Inventors: Ralf Rossbach, Munich (DE); Fangli Xu, Beijing (CN); Bobby Jose, San Diego, CA (US); Ping-Heng Kuo, London (GB); Vijay Venkataraman, San Jose, CA (US); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 295 days.

(21) Appl. No.: 18/415,103

(22) Filed: Jan. 17, 2024

(65) Prior Publication Data

US 2024/0284239 A1 Aug. 22, 2024

Related U.S. Application Data

(60) Provisional application No. 63/485,440, filed on Feb. 16, 2023.

(51) Int. Cl.
*H04W 28/02* (2009.01)

(52) U.S. Cl.
CPC ............................... *H04W 28/0252* (2013.01)

(58) Field of Classification Search
CPC ......... H04W 28/0252; H04W 28/0263; H04W 28/0268; H04W 28/065; H04W 8/24; H04W 28/02; H04L 47/34
See application file for complete search history.

(56) References Cited

U.S. PATENT DOCUMENTS

2017/0289025 A1* 10/2017 Cheng ............... H04W 28/0273
2019/0230560 A1* 7/2019 Huang .................... H04L 47/24
2023/0328831 A1* 10/2023 Kim ...................... H04W 76/19
2024/0259860 A1* 8/2024 Kanamarlapudi ........................... H04W 28/0268

OTHER PUBLICATIONS

3rd Generation Partnership Project; Technical Specification Group Services and System Aspects; System architecture for the 5G System (5GS); Stage 2 (Release 17); 3GPP TS 23.501 V17.7.0; Dec. 2022.

(Continued)

*Primary Examiner* — Mandish K Randhawa
(74) *Attorney, Agent, or Firm* — Eschweiler & Potashnik, LLC; Ningjiao Zhang

(57) ABSTRACT

The techniques described herein may include a device, comprising: a memory; and one or more processors configured to, when executing instructions stored in the memory, cause the device to: communicate, via a wireless communication network, information as in-order traffic using an in-order radio link control (RLC) entity; and communicate, via the wireless communication network, information as out-of-order traffic using an out-of-order RLC entity. The in-order traffic and the out-of-order traffic may be communicated using the same data radio bearer (DRB). The out-of-order traffic may include selective out-of-order delivery (OOD) or per-packet OOD. Additional examples, features and other techniques are also described herein.

20 Claims, 15 Drawing Sheets

(56) References Cited

OTHER PUBLICATIONS

3rd Generation Partnership Project; Technical Specification Group Core Network and Terminals; Non-Access-Stratum (NAS) protocol for 5G System (5GS); Stage 3; (Release 17); 3GPP TS 24.501 V17.9.0; Dec. 2022.

3rd Generation Partnership Project; Technical Specification Group Services and System Aspects; IP Multimedia Subsystem (IMS); Multimedia Telephony; Media handling and interaction (Release 17); 3GPP TS 26.114 V17.6.0; Dec. 2022.

3rd Generation Partnership Project; Technical Specification Group Radio Access Network; NR; Packet Data Convergence Protocol (PDCP) specification (Release 17); 3GPP TS 38.323 V17.3.0; Dec. 2022.

3rd Generation Partnership Project; Technical Specification Group Radio Access Network; NR; Radio Resource Control (RRC) protocol specification (Release 17); 3GPP TS 38.331 V17.3.0; Dec. 2022.

3rd Generation Partnership Project; Technical Specification Group Radio Access Network; NG-RAN; PDU Session User Plane Protocol (Release 17); 3GPP TS 38.415 V17.0.0; Apr. 2022.

Network Working Group; Stream Control Transmission Protocol; Sep. 2007.

* cited by examiner

900

```
RRC IE moreThanTwoRLC
moreThanTwoRLC-DRB-r16 SEQUENCE {
splitSecondaryPath-r16      LogicalChannelIdentity                    OPTIONAL, -- Cond SplitBearer2
duplicationState-r16        SEQUENCE (SIZE (3)) OF BOOLEAN      OPTIONAL -- Need S
outOfOrderDeliveryState-r18 SEQUENCE (SIZE (3)) OF BOOLEAN  OPTIONAL -- Need S
}                                                             OPTIONAL, -- Cond MoreThanTwoRLC-DRB
```

*FIG. 9*

1000

```
RRC IE moreThanOneRLC
moreThanOneRLC SEQUENCE {
    primaryPath     SEQUENCE {
        cellGroup        CellGroupId        OPTIONAL,        -- Need R
        logicalChannel   LogicalChannelIdentity              OPTIONAL -- Need R
    },
    ul-DataSplitThreshold         UL-DataSplitThreshold           OPTIONAL, -- Cond SplitBearer
    pdcp-Duplication              BOOLEAN                         OPTIONAL -- Need R
    pdcp-outOfOrderDelivery-r18   BOOLEAN                         OPTIONAL -- Need R
}                                                                 OPTIONAL, -- Cond MoreThanOneRLC
```

*FIG. 10*

SYSTEMS, METHODS, AND DEVICES FOR OUT-OF-ORDER DELIVERY WITH MULTIPLE RLC ENTITIES

REFERENCE TO RELATED APPLICATIONS

This application claims the benefit of U.S. Provisional Application No. 63/485,440, filed on Feb. 16, 2023, the contents of which are hereby incorporated by reference in their entirety.

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) and network devices, such as base stations, to communicate with one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIGS. 9-10 are examples of information elements (IEs) for OOD with multiple RLC entities according to one or more implementations described herein.

DETAILED DESCRIPTION

Figure 1:
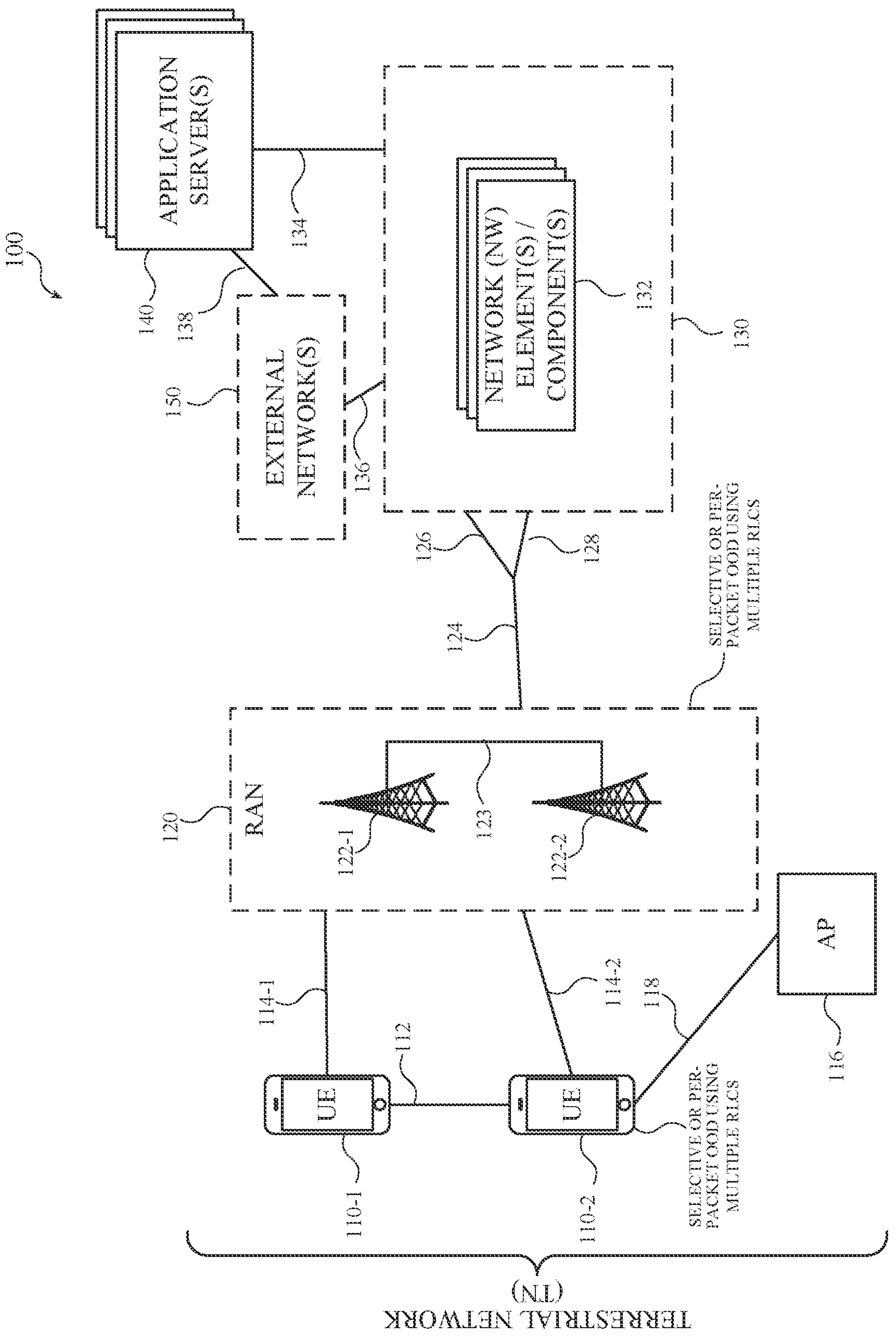
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and/or other network access nodes. UEs and base stations may implement various techniques and communications standards for enabling UEs and base stations to discover one another, establish and maintain connectivity, and exchange information in an ongoing manner. Objectives of such techniques may include connection reliability, seamless connectivity between devices, multiple points of connection, quality of service and throughput rates, and more. Aspects of telecommunications that relate to how devices communicate with each other include data radio bearers (DRBs) and packet data convergence protocol (PDCP).

For a given data radio bearer (DRB) the new radio (NR) PDCP layer may support reordering and in-order delivery of service data units (SDUs) as a default or mandatory configuration. The functionality of this feature may entail a PDCP receiver ensuring that packets are delivered to upper layers in-sequence (according to a PDCP sequence number (SN)). A reordering function may be used to provide in-sequence delivery of SDUs, which may involve a temporary buffering of SDUs received out-of-sequence, as well as the operation of a reordering timer. Additionally, reordering may be based on sequence numbers (COUNT) deducted/received from every PDCP packet (hyper frame number (HFN), SN) and a reordering timer configured by radio resource control (RRC). Thus, the reordering function may not only require memory for intermediate storage, but it may also increase an overall end-to-end latency and cause delay variance. RRC can optionally configure a DRB to operate without strict in-sequence delivery. In such a scenario, the PDCP receiver may deliver PDCP SDUs to upper layers immediately (e.g., in the order received), and depending on the reception order, this may result in packets being delivered out of sequence. This function may be referred to as "out-of-order delivery," and it may be enabled for the Uu interface or the sidelink (SL) interface. The example on the right applies to the Uu interface.

Configuring devices for out-of-order delivery (OOD) may be beneficial for DRBs that carry traffic where reordering is provided at higher layers. Examples of such benefits may include latency reduction for end-to-end services, a reduction in memory or buffer usage, and so on. Situations where OOD may be beneficial may include low latency and ultra-reliable low latency communication (URLLC) scenarios, preferably via separate beams. Examples of such situations may include a real-time protocol (RTP), such as video streaming, because of the low latency requirements, real-time audio streaming since reordering may be performed in the application jitter buffer, and so on. Stream control transmission protocol (SCTP) may be used to ensure that message are delivered in-sequence within a given stream. If multiple streams are used in an SCTP scenario, reordering at PDCP may result in longer delays for application streams using SCTP. SCTP provides a mechanism for bypassing the in-sequence delivery service. For example, user messages sent using this mechanism may be delivered to the SCTP user as soon as they are received.

In-order or in-sequence delivery (as well as PDCP reordering) may be beneficial to transmission control protocol (TCP) scenarios. Newer versions of the TCP protocol may handle out-of-sequence reception of packets more gracefully compared to older TCP protocol versions. Robust header compression (RoHC) and uplink data compression (UDC) may only be processed in-sequence, so if there are PDCP out-of-sequence packets that become in-sequence, the packet may be fed back to a RoHC engine or UDC engine. As such, OOD is not supported when RoHC or UDC are configured, and both functions may only be configured per DRB.

Extended reality (XR) traffic may benefit from tight latency constraints, and delivering packets out-of-order may help reduce the latency. In other words, upper layer traffic may benefit from OOD, for example, on certain real-time protocol (RTP) sessions, RTP streams, PDU set types or traffic flows, or for single packets/PDU sets. However, OOD is currently limited to a per-DRB basis only, thereby limiting the flexibility with which different types of traffic and traffic flows may be using OOD.

One or more of the techniques described herein provide a solution to this by enabling OOD below the resolution of a DRB, that is, at the granularity of an RLC entity. This allows the network and devices to selectively support ODD when needed. One or more of these solutions target a scenario where multiple PDU Sets or QoS flows are mapped to the same DRB but different RLC entities. The current 5th generation (5G) architecture supports an option where one DRB may be linked with multiple RLC entities, for example, in the case of a split bearer or for PDCP duplication. The techniques described herein may be used to extend this capability to split traffic not only over different RLC entities in multiple cell groups (as in dual connectivity) but also to split in-order and out-of-order traffic over different RLC entities. The split may happen on the same cell group or over different cell groups. Hence different RLC entities may be used for transmission of different types of traffic (e.g., according to a sequence ordering characteristic) with multiple RLC entities connected to the same DRB. RRC configuration may be used to set up RLC entities with in-order and OOD modes (e.g., matching the upper layer configuration). These and other features and capabilities are enabled by one or more of the techniques described herein.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, and external networks 150.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with one or more other UEs 110 via one or more wireless channels 112, each of which may comprise a physical communications interface/layer. The connection may include an M2M connection, MTC connection, D2D connection, SL connection, etc. The connection may involve a PC5 interface. In some implementations, UEs 110 may be configured to discover one another, negotiate wireless resources between one another, and establish connections between one another, without intervention or communications involving RAN node 122 or another type of network node. In some implementations, discovery, authentication, resource negotiation, registration, etc., may involve communications with RAN node 122 or another type of network node.

UEs 110 may use one or more wireless channels 112 to communicate with one another. As described herein, UE 110-1 may communicate with RAN node 122 to request SL resources. RAN node 122 may respond to the request by providing UE 110 with a dynamic grant (DG) or configured grant (CG) regarding SL resources. A DG may involve a grant based on a grant request from UE 110. A CG may involve a resource grant without a grant request and may be based on a type of service being provided (e.g., services that have strict timing or latency requirements). UE 110 may perform a clear channel assessment (CCA) procedure based on the DG or CG, select SL resources based on the CCA procedure and the DG or CG; and communicate with another UE 110 based on the SL resources. The UE 110 may communicate with RAN node 122 using a licensed frequency band and communicate with the other UE 110 using an unlicensed frequency band.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 110, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As described herein, UE 110 may receive and store one or more configurations, instructions, and/or other information for enabling SL-U communications with quality and priority standards. A PQI may be determined and used to indicate a QoS associated with an SL-U communication (e.g., a channel, data flow, etc.). Similarly, an L1 priority value may be determined and used to indicate a priority of an SL-U transmission, SL-U channel, SL-U data, etc. The PQI and/or L1 priority value may be mapped to a CAPC value, and the PQI, L1 priority, and/or CAPC may indicate SL channel occupancy time (COT) sharing, maximum (MCOT), timing gaps for COT sharing, LBT configuration, traffic and channel priorities, and more.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 116 may comprise a local wireless connection, such as a connection consistent with any IEEE 802.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via Ipsec protocol tunneling to authenticate and encrypt packets (e.g., Internet Protocol (IP) packets) communicated via connection interface 118. Ipsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 1G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 122, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (Dus) connected to a gNB-control unit (CU) via individual F1 or other interfaces. In such implementations, the gNB-Dus may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (Res); in the frequency domain, this may represent the smallest quantity of resources that currently may be allocated. There are several different physical downlink channels that are conveyed using such resource blocks.

Further, RAN nodes 122 may be configured to wirelessly communicate with Ues UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using stand-alone unlicensed operation, licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

As described herein, UE 110 and base station 122 may communicate with one another using in-order traffic and out-of-order traffic. These communications may include multiple RLC entities associated with a single DRB. The out-of-order traffic may comprise selective out-of-order delivery OOD or per-packet OOD delivery. Traffic may include PDUs SDUs, QoS flows, and more. Selective OOD may include OOD that may apply to traffic in a QoS flow, PDU set, PDU set type, PDU session, RTP session, traffic flow or SDF. Per-packet OOD may include an ability of a PDCP layer of UE 110 to immediately relay (or deliver, after completion of PDCP processing) received information on a per-packet basis to upper layers. In-order traffic may be differentiated from out-of-order traffic based on the corresponding traffic flow, packet header flags, payload content, QoS rules, and more.

The RAN nodes 122 may be configured to communicate with one another via interface 123. In implementations where the system is an LTE system, interface 123 may be an X2 interface. In NR systems, interface 123 may be an Xn interface. The X2/Xn interface may be defined between two or more RAN nodes 122 (e.g., two or more eNBs/gNBs or a combination thereof) that connect to evolved packet core (EPC), 5GC or CN 130, or between two eNBs/gNBs connecting to an EPC/5GC.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CN 130 (e.g., universal mobile telecommunications system packet services (UMTS PS) domain, LTE PS data services, etc.). Application servers 140 may also, or alternatively, be configured to support one or more communication services (e.g., voice over IP (VOIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

Figure 2:
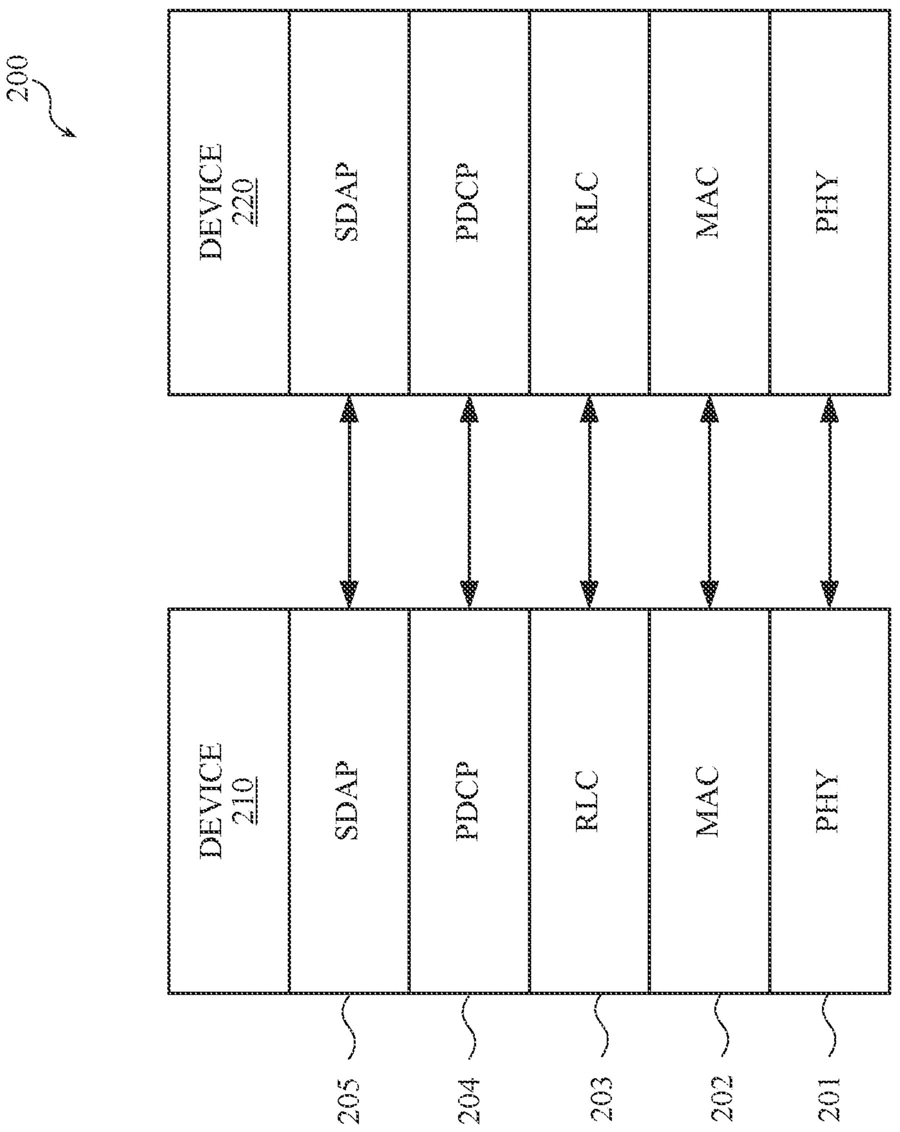
FIG. 2 is a diagram of an example of user plane protocol stacks in accordance with one or more implementations described herein.

FIG. 2 is a diagram of an example of user plane protocol stacks 200 in accordance with one or more implementations described herein. User plane protocol stacks 200 may be implemented as a communications protocol between communication devices 210 and 220, which may be implemented as UE 110, base station 122, and/or one or more other type of device. Device 210 and 220 may be referred to herein as "transmitter" or "receiver," which may refer to an example in which one device is transmitting information and the other device is receiving information.

The PHY layer 201 may transmit or receive information used by the MAC layer 202 over one or more air interfaces. The PHY layer 201 may further perform link adaptation or adaptive modulation and coding (AMC), power control, cell search (e.g., for initial synchronization and handover purposes), and other measurements used by higher layers, such as the RRC layer 205. The PHY layer 201 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 202 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 203 may operate in a plurality of modes of operation, including: Transparent Mode (TM), Unacknowledged Mode (UM), and/or Acknowledged Mode (AM). The RLC layer 203 may execute transfer of upper layer protocol data units (PDUs), error correction through automatic repeat request (ARQ) for AM data transfers, and concatenation, segmentation and reassembly of RLC SDUs for UM and AM data transfers. The RLC layer 203 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 204 may execute header compression and decompression of IP data, maintain PDCP sequence numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Service data adaptation protocol (SDAP) layer 205 may exist in the user plane in both gNB and UE. SDAP layer 205 may interface to upper layers via QoS flows and to the PDCP lower layer via Data Radio Bearers (DRBs). Traffic from QoS flows may be mapped to suitable DRBs. When SDAP receives a PDU from upper layer flow (e.g., TCP/IP), the PDU is associated with QoS for this flow. SDAP layer 205 may map the flow to a DRB. Similarly, when a PDU is received at the PDCP, the PDU may contain an SDAP header which may be removed, and the PDU is passed to upper layer.

According to currently available technologies for PDCP, each radio bearer (RB), (except for SRB0 for the Uu interface) may be associated with one PDCP entity. Each PDCP entity may be associated with one, two, three, four, six, or eight RLC entities depending on a corresponding RB characteristic (e.g., unidirectional/bi-directional or split/non-split) or RLC mode. One or more of the techniques described herein may include a further extension. For example, for RBs configured with selective OOD or per-packet OOD, each PDCP entity (or entity) may be associated with multiple RLC entities (or entity) (e.g., at least one for OOD and at least one for in-order delivery). Additionally, an OOD configuration may be combined with another RB configuration, such as a PDCP duplication or split bearer, a dual active protocol stack (DAPS) bearer, a multicast radio bearer (MRB), etc. Further, an OOD configuration may be applied to RLC unacknowledged mode (UM) and/or RLC acknowledged mode (AM). An OOD configuration may also be applied to layer 2 (L2) user equipment (UE) to network (U2N) relay or sidelink (SL).

When multiple RLC entities are used for a DRB, a transmitter entity (e.g., UE 110 or base station 122) may be configured (e.g., by RRC for the UE; by higher layers or operator config for the gNB) to select a specific RLC entity or RLC entity subset (e.g., multiple RLC entities when PDCP duplication is used) for transmission of packets with OOD. For a given DRB, both the PDCP transmitter and the PDCP receiver may be configured with a matching association between DRBs and RLC entities (e.g., RLC channels/LCHs) to achieve this. Therefore, a PDCP receiver may apply OOD to packets (e.g., PDCP SDUs) received on a matching or corresponding RLC entity or RLC entity subset. Additionally, a PDCP transmitter may submit PDCP PDUs to an associated RLC entity or RLC entity subset based on a rule or configuration. The PDCP receiver may deliver PDCP SDUs according to the delivery mode configured for the associated RLC entity or RLC entity subset. RRC may be used to configure the PDCP entity for both UL and DL communications.

When multiple QoS flows, PDU sets or certain PDU set types are mapped to the same DRB, the PDCP layer may map packets of at least one QoS flow, PDU set or PDU set type to at least one RLC entity and LCH associated with in-order delivery or OOD, thus allowing for different sequence ordering behaviors at different RLC entities/LCHs. From a PDCP receiver perspective, the DRB may be able to switch the sequence ordering behavior between in-order delivery and OOD to upper layers based on which RLC entity received the packet or traffic flow. Additionally, or alternatively, mapping may apply to each, or one or more, PDCP SDU associated with a PDU set type, PDU set, PDU in a PDU set, PDU, QoS flow, RTP session, service data flow (SDF), etc.

Figure 3:
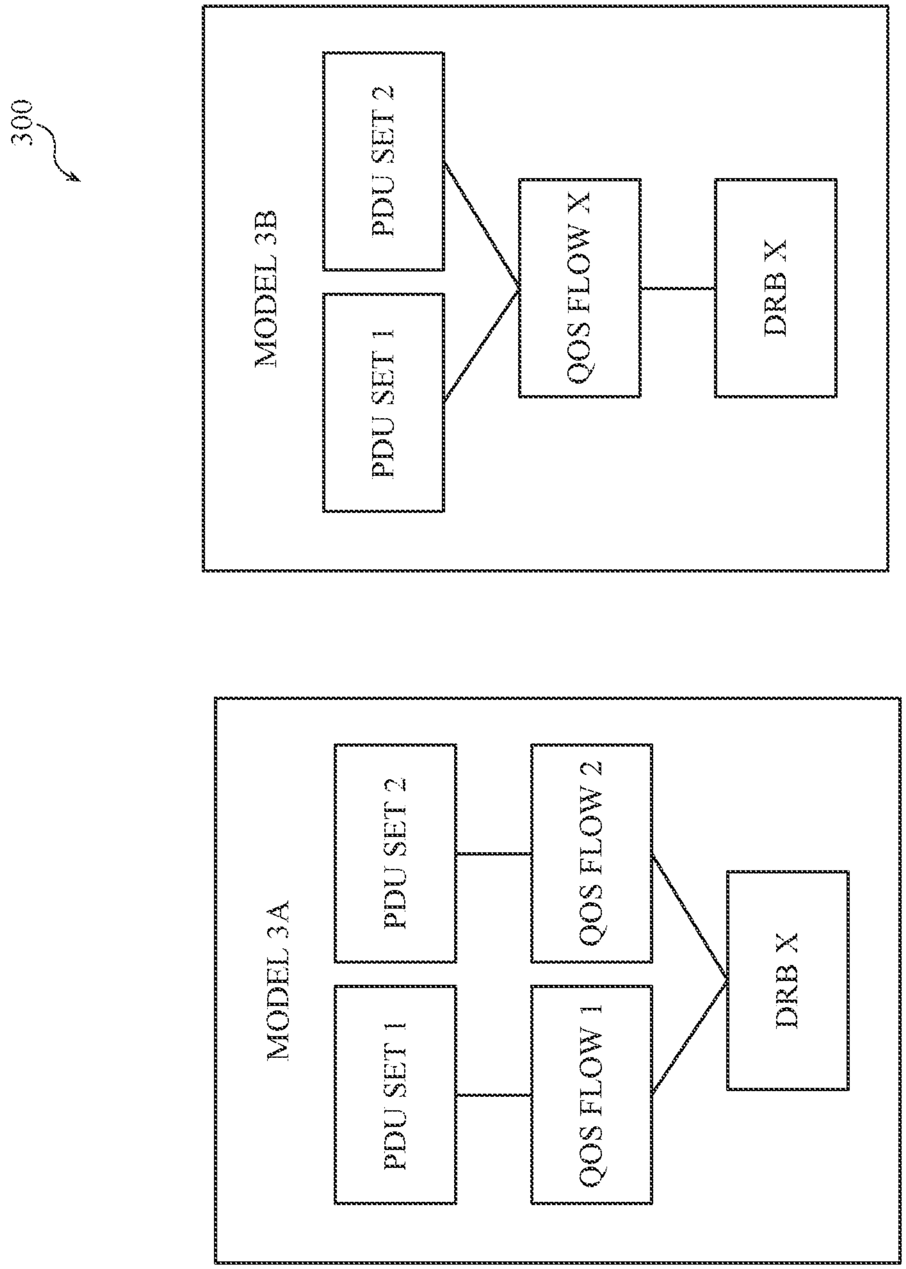
FIG. 3 is a diagram of examples of communication models according to one or more implementations described herein.

FIG. 3 is a diagram of examples of communication models 300 according to one or more implementations described herein. Model 3A and model 3B may include examples of PDU set/QoS flow to DRB mapping to which one or more of the techniques described herein may be implemented. In model 3A, PDU set 1 and PDU set 2 may each be mapped to QoS flow 1 and QoS flow 2, respectively. In turn, QoS flow 1 and QoS flow 2 may each be mapped to DRB X. In model 3B, PDU set 1 and PDU set 2 may each be mapped to QoS flow X, and QoS flow X may be mapped to DRB X. Thus, one or more of the techniques described herein may involve PDU sets being mapped to a DRB via QoS flows and/or PDU sets being mapped to a DRB via a QoS flow.

Figure 4:
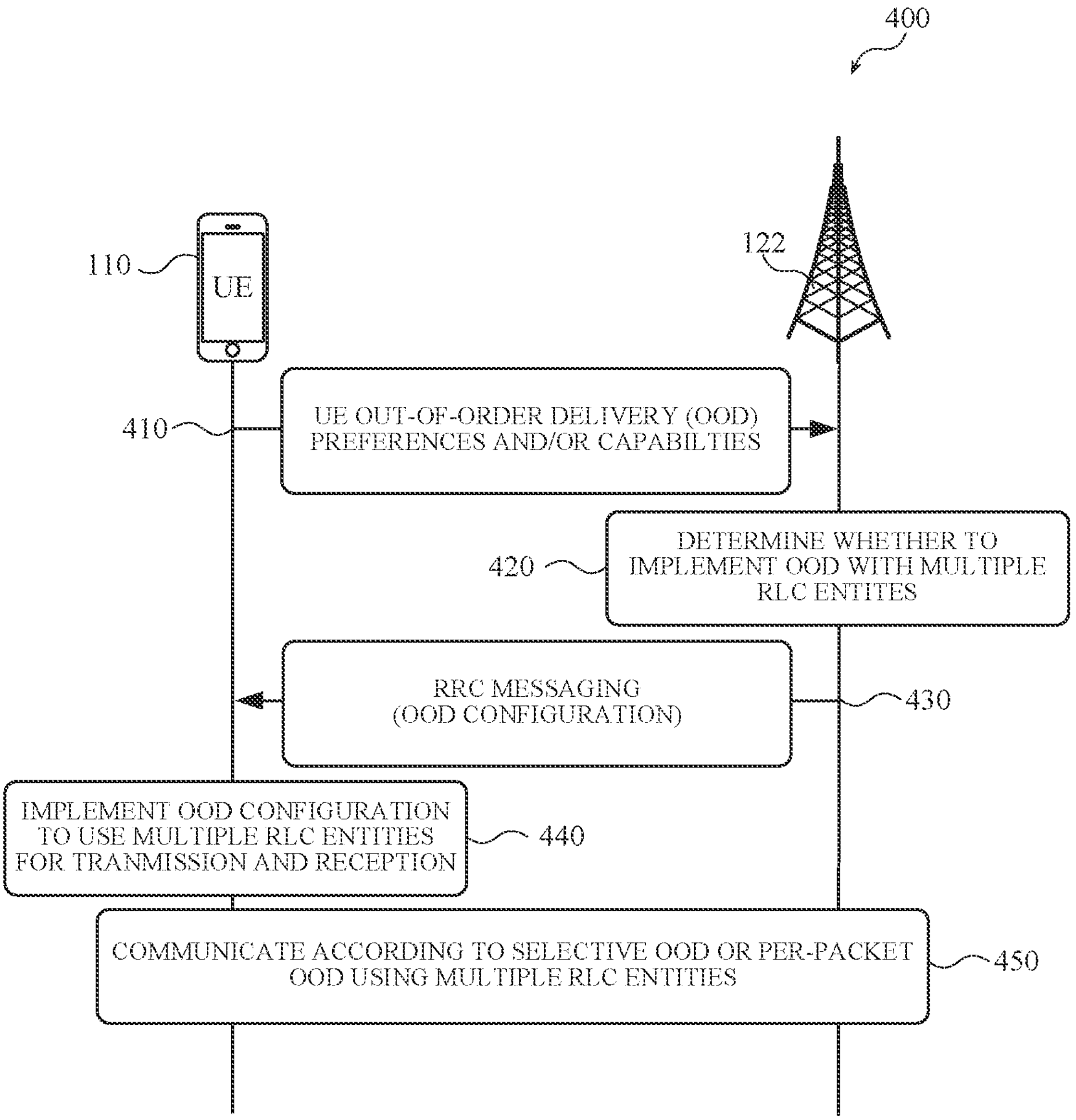
FIG. 4 is a diagram of an example process for out-of-order delivery (OOD) using multiple radio link control (RLC) entities according to one or more implementations described herein.

FIG. 4 is a diagram of an example process 400 for OOD using multiple RLC entities according to one or more implementations described herein. Process 400 may be implemented by UE 110 and one or more base stations 122. In some implementations, some or all of process 400 may be performed by one or more other systems or devices, including one or more of the devices of FIG. 1 or 2, such as a function of CN 130. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or process depicted in FIG. 4.

As shown, process 400 may include UE 110 providing base station 122 with UE preference and/or capability information regarding OOD (at 410). UE preference information may include UE assistance information (UAI) or signaling that describes or indicates a preference of UE 110 for selective OOD or per-packet OOD. The UE assistance information (e.g. in RRC) or other preference information may indicate whether UE 110 prefers to activate or deactivate selective or per-packet OOD on one or more DRBs, RLC entities, QoS flows, and/or PDU set types. A PDU set type may include a specific type of application layer information, such as application data units (ADU) of a common characteristic or frame type (e.g., an intra-frame (I-frame), a predicted frame (P-frame), a bi-directional frame (B-frame) for video). A PDU set type may also, or alternatively, include a codec type (e.g., audio, video, multimedia, etc.), a slice type, etc. Additionally, or alternatively, a PDU set type may be associated with PDU set information (e.g., a specific PDU set importance) or a specific QoS category characterized by QoS parameters (e.g., a PDU set delay budget (PSDB), a PDU set error rate (PSER), a validity time, etc.). A PDU set may include a specific or selected set of PDUs. Additionally, or alternatively, the UE preference information may indicate which state of ODD (e.g., selective OOD or per-packet OOD) UE 110 would prefer be applied to one or more DRBs, RLC entities, QoS flows, and/or PDU set types. UE capability information may include an indication of whether UE 110 is capable of communicating via out-of-order delivery (OOD), per-packet OOD, and/or selective OOD. UE 110 may provide the UE preference and/or capability information as part of an access or attachment procedure or as part of another type of procedure to establish or update communications between UE 110 and base station 122. In some implementations, UE 110 may provide the UE information as part of a procedure to establish a DRB with base station 122.

Additionally, or alternatively, OOD may include an ability of a PDCP layer of UE 110 to immediately relay or deliver, after completion of PDCP processing, received data units (PDUs, SDUs, etc.) to higher layers of UE 110 (e.g., regardless of whether the data units are received by the PDCP layer in-order. In such a scenario, the data units may be reordered by one of the higher layers of UE 110. Selective OOD may include OOD that may apply to traffic in a QoS flow, PDU set, PDU set type, PDU session, RTP session, traffic flow or SDF. Per-packet OOD may include an ability of a PDCP layer of UE 110 to immediately relay received information on a per-packet basis. For example, UE 110 may determine whether a received packet indicates that the packet is designated for OOD and process the packet accordingly.

Process 400 may include base station 122 determining whether to implement OOD using multiple RLC entities (block 420). For example, Upon the reception of the UAI or signaling described above, base station 122 may evaluate whether selective or per-packet OOD behavior is to be configured in accordance with the UE preference and/or capability information. In some implementations, base station 122 may configure the selective ODD or per-packet OOD behavior in accordance to UE's preference. Additionally, or alternatively, base station 122 may send UE 110 a response message or signal (not shown), indicating whether ODD is to be implemented.

Process 400 may also include base station 122 generating an OOD configuration based on these determination and providing the OOD configuration to UE 110 via an RRC message or another type of signaling (block 430). Process 400 may further include UE 110 implementing the OOD configuration to use multiple RLC entities for transmission and reception of information (block 440). Example 400 may include a scenario in which multiple RLC entities are used for bi-directional communications (e.g., for both UL and DL communications). However, in some implementations, multiple RLC entities may only be used and configured for unidirectional communications (e.g., either UL communications or DL communications). In such implementations, operation 440 may refer to implementing an OOD configuration to use multiple RLC entities for transmission or reception). Process 400 may also include UE 110 and base station 122 may communicating using selective OOD or per-packet OOD using multiple RLC entities (block 450).

Figure 5:
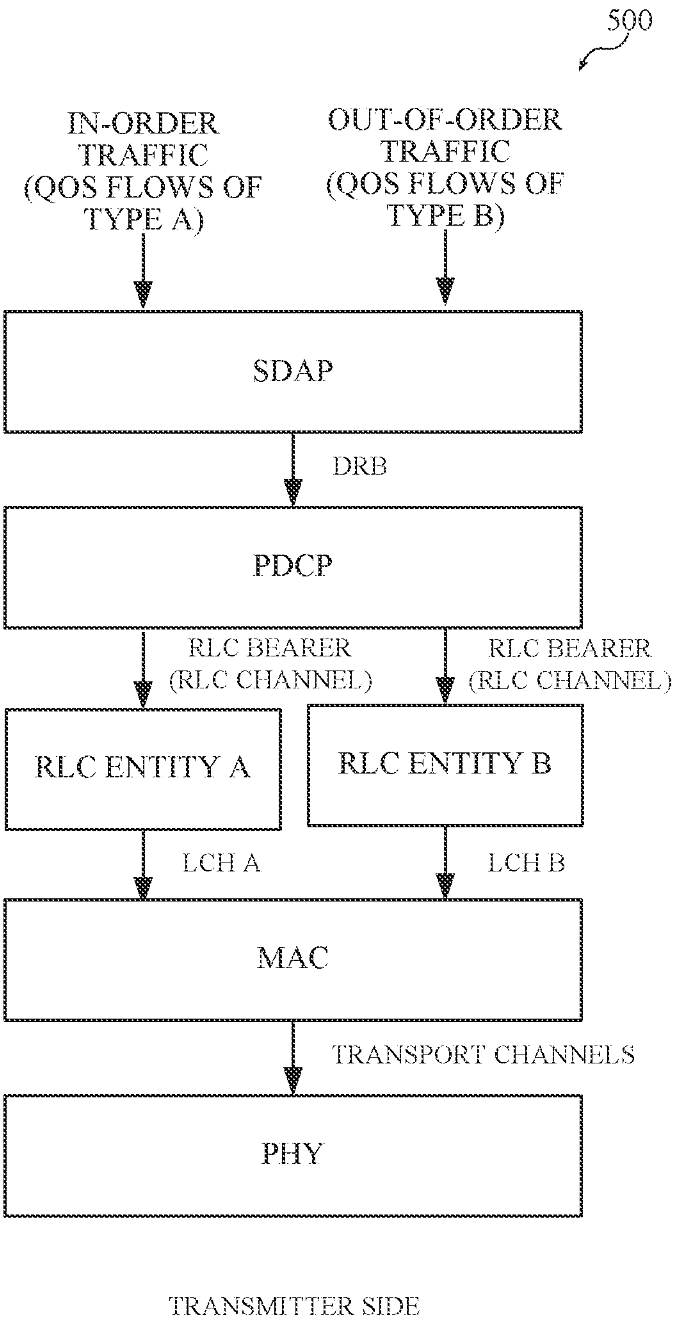
FIGS. 5-6 are diagrams of examples of a user plane stack of a transmitter and corresponding user plane stack of a receiver according to one or more implementations described herein.
Figure 6:
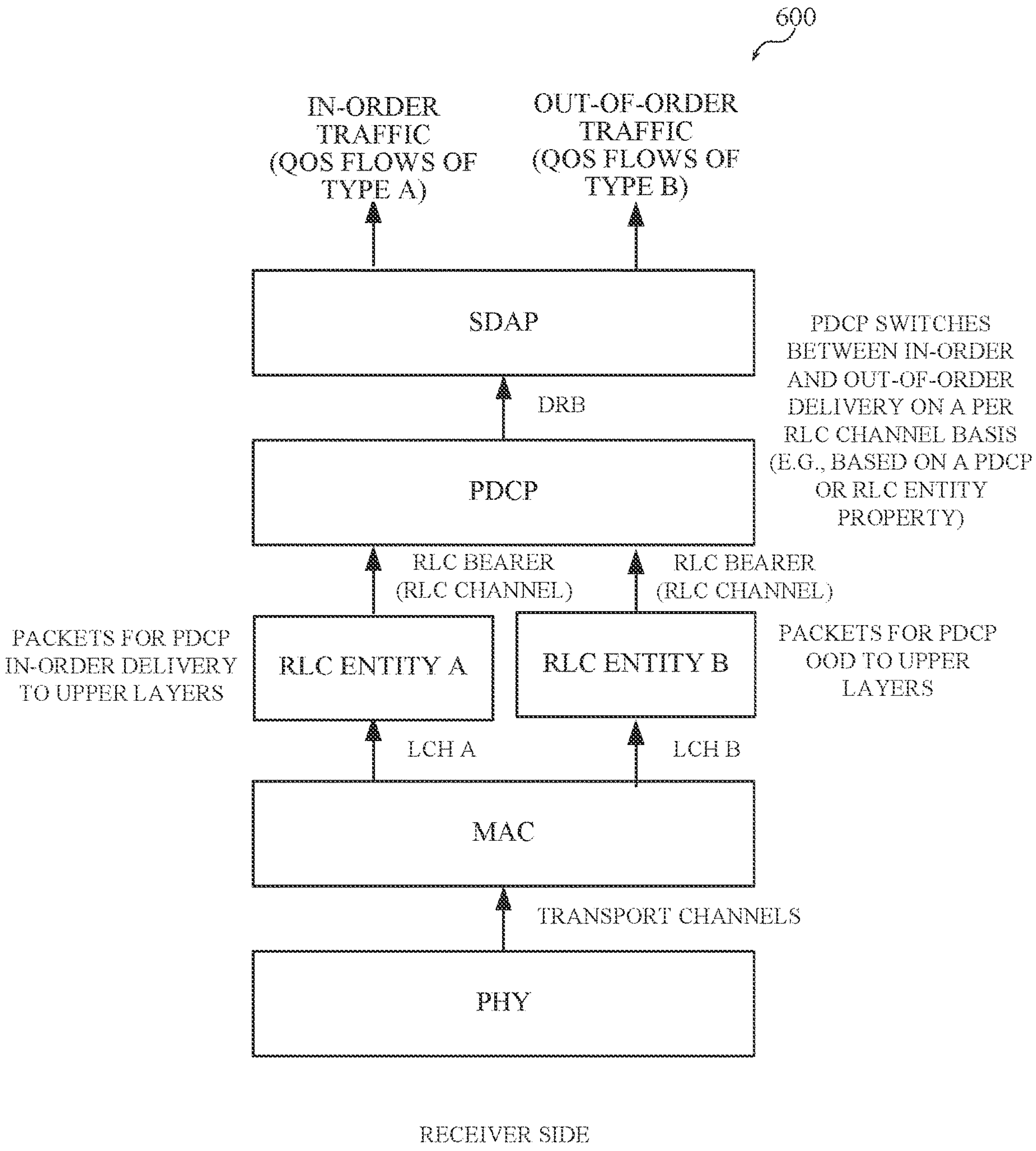

FIGS. 5-6 are diagrams of examples of a user plane stack of a transmitter 500 and corresponding user plane stack of a receiver 600 according to one or more implementations described herein. The transmitter may be implemented as UE 110, base station 122, UPF, or another device or entity of FIGS. 1-2. FIGS. 5-6 may correspond to model 3A of FIG. 3.

Traffic may be one or more PDU set types of the same ordering characteristic; one or more PDUs of the same ordering characteristic in a PDU set; or one or more PDCP SDUs of the same ordering characteristic; or one or more SDAP SDUs of the same ordering characteristic. Alternatively, traffic may be represented by one or more traffic flows of the same ordering characteristic; one or more SDFs of the same ordering characteristic; or one or multiple QoS flows of the same ordering characteristic. The ordering characteristic may be whether the traffic is configured for in-order delivery or OOD.

Packets, as described herein, may include PDCP PDUs associated with at least one RLC entity for the transmission of: one or more PDU set types of the same ordering characteristic; one or more PDUs in a PDU set of the same ordering characteristic; or one or more PDCP SDUs, RLC PDUs, RLC SDUs or RLC SDU segments of the same ordering characteristic. Additionally, or alternatively, "packets may include: one or more traffic flows of the same ordering characteristic; one or more QoS flows of the same ordering characteristic; one or more SDFs of the same ordering characteristic; or one or more RLC channels/logical channels of the same ordering characteristic. The ordering characteristic may include in-order delivery or OOD.

The PDCP transmitter entity may submit packets to an RLC entity. This may be controlled based on a configuration from higher layers for the packet, traffic flow, RTP session, QoS flow, PDU Set type, PDU set, and/or via network configuration for a given flow, session, or DRB. At reception of a PDCP SDU from upper layers, if an upper layer configuration determines that the packet shall be delivered in OOD mode, the transmitting PDCP entity may submit the PDCP PDU to an RLC entity or RLC entity subset configured for OOD. Alternatively, the transmitting PDCP entity may submit the PDCP PDU to an RLC entity or RLC entity subset configured for OOD at the request of the upper layers.

In other implementations, and as part of the PDCP data transfer procedure for a transmitting operation, when the PDCP transmitter receives a PDCP SDU from higher layers that is associated with a QOS flow, PDU Set or PDU set type configured for OOD, the PDCP transmitter may submit the PDCP PDU to a RLC entity or RLC entity subset configured for OOD. In yet other implementations, when the PDCP transmitter receives a PDCP SDU from higher layers that is marked with a per-packet OOD indication (e.g., a value in a packet header), the PDCP entity may submit the PDCP PDU to a RLC entity or RLC entity subset configured for OOD.

The receiving PDCP entity may be aware of an association between RLC entities and DRBs, including which RLC entities are configured with OOD. By default, in-order delivery mode may be applied to all RLC entities not configured with OOD as a default. At reception of a PDCP data PDU from lower layers, the receiving PDCP entity shall determine the OOD mode associated with the RLC entity. Upon reception of a PDCP data PDU from lower layers, the receiving PDCP entity may deliver the resulting PDCP SDU to upper layers after performing header decompression using EHC when the IE outOfOrderDelivery is so configured.

Alternatively, when selective OOD or per-packet OOD is configured for the RLC entity from which the PDCP PDU was received, the receiving PDCP entity may deliver the resulting PDCP SDU to upper layers after performing header decompression using Ethernet Header Compression (EHC). In some implementations, selective or per-packet OOD mode may be detected at the receiving RLC entity. In this case, the receiving RLC entity may inform the PDCP entity that the received RLC SDU/PDCP PDU is to be delivered out-of-order. When the receiving RLC entity is configured with OOD detection, the RLC entity may indicate a packet is marked for OOD to upper layers when such a packet is detected.

Figure 7:
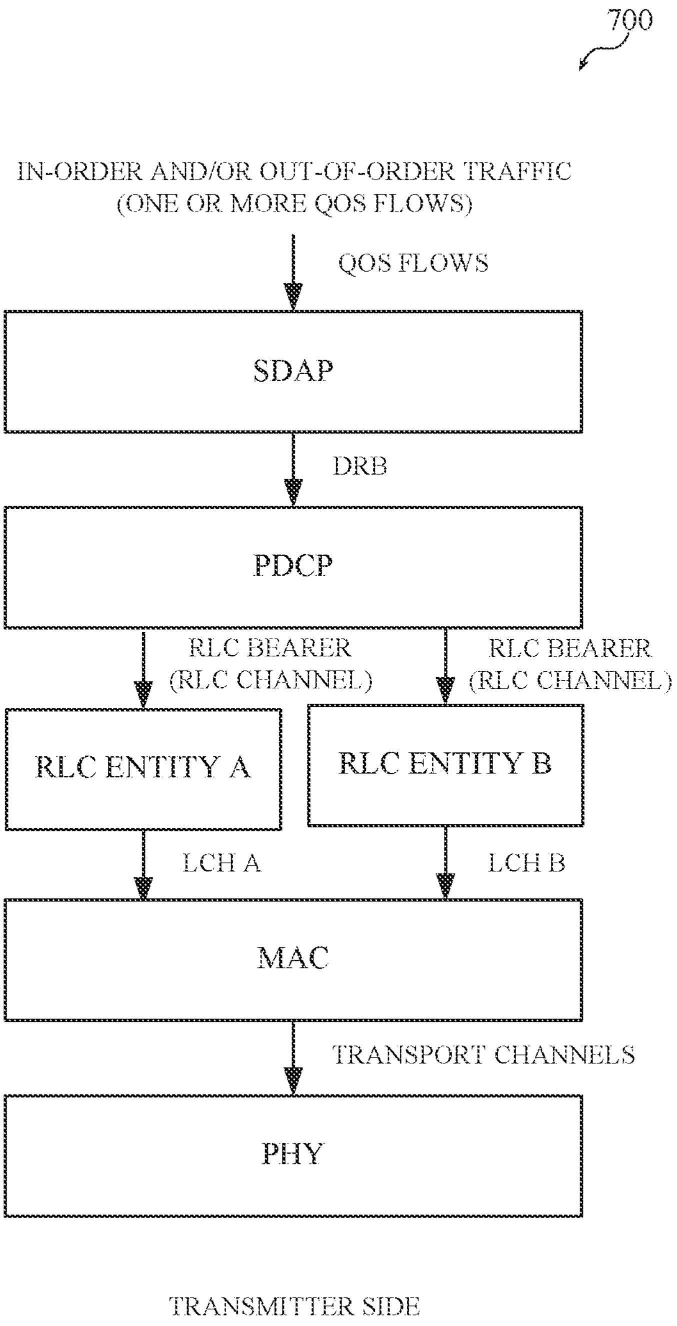
FIGS. 7-8 are diagrams of examples of a user plane stack of a transmitter and corresponding user plane stack of a receiver according to one or more implementations described herein.
Figure 8:
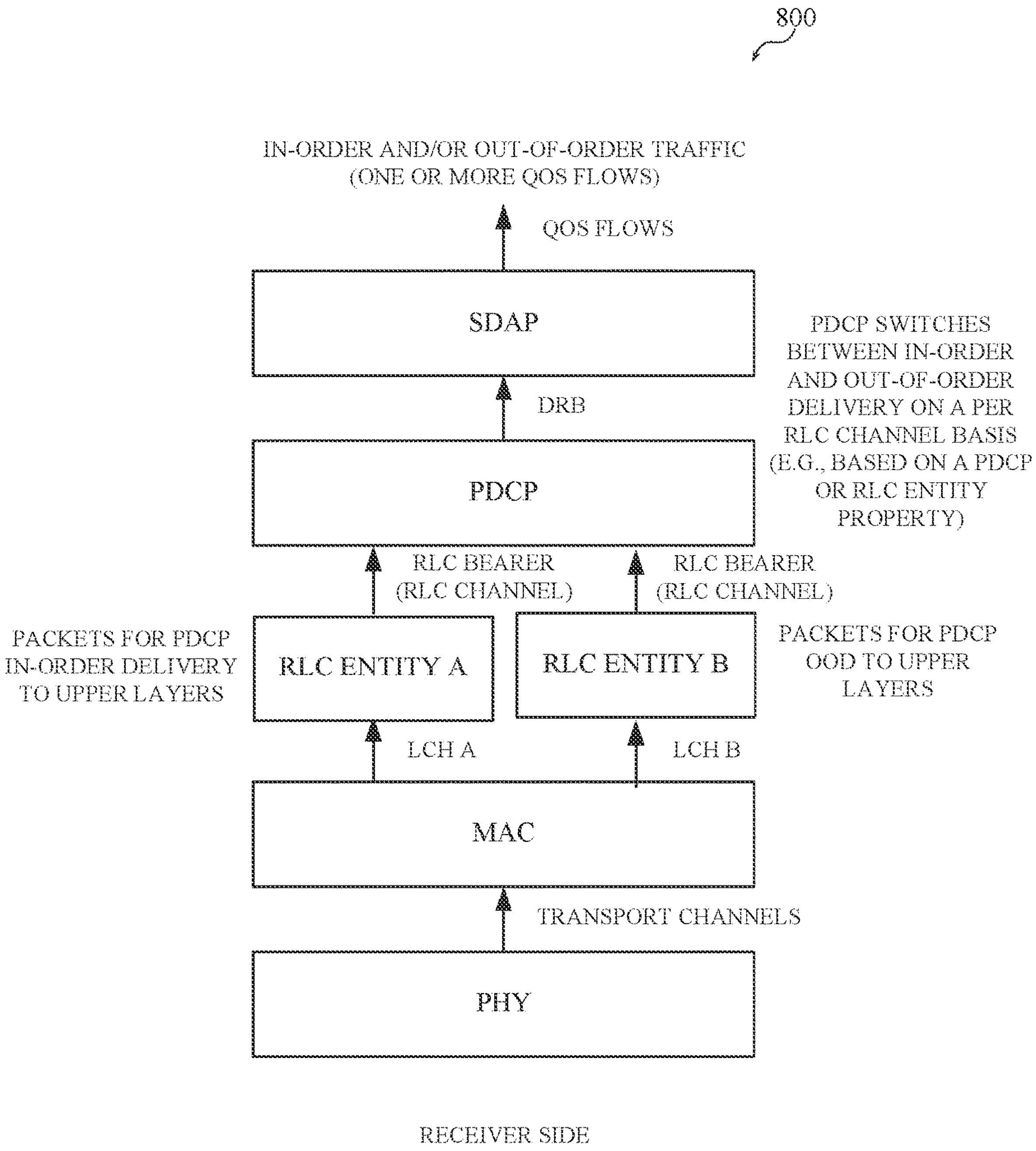

FIGS. 7-8 are diagrams of examples of a user plane stack of a transmitter 700 and corresponding user plane stack of a receiver 800 according to one or more implementations described herein. The transmitter may be implemented as UE 110, base station 122, UPF, or another device or entity of FIGS. 1-2. FIGS. 7-8 may correspond to model 3B of FIG. 3.

Traffic may be one or more PDU set types of different reordering characteristic; one or more PDUs of different reordering characteristic in a PDU set; one or more PDCP SDUs of the same ordering characteristic; or one or more SDAP SDUs of different reordering characteristic. Alternatively, traffic may be represented by one or more traffic flows of different reordering characteristic; one or more SDFs of different reordering characteristic; or one or multiple QoS flows of different reordering characteristic. The ordering characteristic may be whether the traffic configured for in-order delivery or OOD.

Packets, as described herein, may include PDCP PDUs associated with at least one RLC entity for the transmission of: one or more PDU set types of the same ordering characteristic; one or more PDUs in a PDU set of the same ordering characteristic; or one or more PDCP SDUs, RLC PDUs, RLC SDUs or RLC SDU segments of the same ordering characteristic. Additionally, or alternatively, "packets may include: one or more traffic flows of the same ordering characteristic; one or more QoS flows of the same ordering characteristic; one or more SDFs of the same ordering characteristic; or one or more RLC channels/logical channels of the same ordering characteristic. The ordering characteristic may include in-order delivery or OOD.

The PDCP transmitter entity may submit packets an RLC entity. This may be controlled based on a configuration from higher layers for the packet, traffic flow, RTP session, QoS flow, PDU Set type, PDU set, and/or via network configuration for a given flow, session, or DRB. At reception of a PDCP SDU from upper layers, if an upper layer configuration determines that the packet shall be delivered in OOD mode, the transmitting PDCP entity may submit the PDCP PDU to an RLC entity or RLC entity subset configured for OOD. Alternatively, the transmitting PDCP entity may submit the PDCP PDU to an RLC entity or RLC entity subset configured for OOD at the request of the upper layers.

In other implementations, when the PDCP transmitter receives a PDCP SDU from higher layers that is associated with a QOS flow, PDU Set or PDU set type configured for OOD, the PDCP transmitter may submit the PDCP PDU to a RLC entity or RLC entity subset configured for OOD. In yet other implementations, when the PDCP transmitter receives a PDCP SDU from higher layers that is marked with a per-packet OOD indication (e.g., a value in a packet header), the PDCP entity may submit the PDCP PDU to a RLC entity or RLC entity subset configured for OOD.

The receiving PDCP entity may be aware of an association between RLC entities and DRBs, including which RLC entities are configured with OOD. By default, in-order delivery mode may be applied to all RLC entities not configured with OOD as a default. At reception of a PDCP data PDU from lower layers, the receiving PDCP entity shall determine the OOD mode associated with the RLC entity. Upon reception of a PDCP data PDU from lower layers, the receiving PDCP entity may deliver the resulting PDCP SDU to upper layers after performing header decompression using EHC when the IE outOfOrderDelivery is so configured.

Alternatively, when selective OOD or per-packet OOD is configured for the RLC entity from which the PDCP PDU was received, the receiving PDCP entity may deliver the resulting PDCP SDU to upper layers after performing header decompression using Ethernet Header Compression (EHC). In some implementations, selective or per-packet OOD mode may be detected at the receiving RLC entity. In this case, the receiving RLC entity may inform the PDCP entity that the received RLC SDU/PDCP PDU is to be delivered out-of-order. When the receiving RLC entity is configured with OOD detection, the RLC entity may indicate a packet is marked for OOD to upper layers when such a packet is detected.

FIGS. 9-10 are examples of information elements (IEs) 900 and 1000 for OOD with multiple RLC entities according to one or more implementations described herein. Since delivery of SDUs to upper layers may be a function of the PDCP layer, a new RRC field could be allocated in an RRC IE, such as the pdcp-config IE, to configure an RLC entity or RLC entity subset for OOD. The new RRC field parameter may provide a mapping or logical association between DRBs and RLC entities (e.g., in a new bitmap or sub-field).

Similar to legacy outOfOrderDelivery, RRC may not configure selective OOD or per-packet OOD together with UDC or RoHC. An extension of the current RRC specification may be implemented for an additional restriction, by excluding also the selective/per-packet OOD delivery mode from being configured together with UDC or RoHC, including a configuration where not only a DRB but also an RLC entity or RLC entity subset is involved.

In some implementations, the new RRC field parameter (e.g., indicating selective or per-packet deliver in an outOfOrderDeliveryPath or the like) may be defined to indicate a cell group ID and/or LCH IDs (LCIDs) of the RLC entity or RLC entity subset for UL and/or DL OOD of data when at least one RLC entity is associated with an PDCP entity. In other implementations, RLC entities may be defined, specified, and/or associated with OOD in a certain order for a given DRB, or by enumerating them, such that only certain positions in the list may be configured with selective or per-packet OOD. Alternatively, RRC entities used for OOD may be pre-configured.

Referring to FIG. 9, an RRC IE moreThanTwoRLC may be used to map or logically associate DRBs with RLC entities. As shown, IE 900 may include an outOfOrderDeliveryState parameter to indicate selective or per-packet OOD for a LCH. Referring to FIG. 10, IE 1000 may include an RRC IE moreThanOneRLC with a pdcp-outOfOrderDelivery to indicate selective or per-packet OOD for a Cell Group and LCH.

In some scenarios, a fast or dynamic adjustment of the OOD association between a DRB and an RLC entity, RLC entity subset, or creation of a complete DRB, may be implemented. While the configuration of an OOD mode may typically be a rather static association according to the characteristics of an upper layer flow or packet, multiple RLC entities may be used for more than just OOD scenarios. For example, multiple RLC entities may be used to provide additional redundancy through PDCP duplication, or to achieve a differentiated or otherwise defined treatment of PDU sets over the radio interface. These treatments may overlay or coexist with OOD mode. In other words, an RLC entity may be configured for OOD and PDCP duplication (or another multiple RLC association) at the same time. While OOD may be rather static, the association of RLC entities for PDCP duplication may change dynamically based on radio conditions and network preferences.

In such scenarios, when the network activates, deactivates, or reconfigures RLC entities for PDCP duplication or the like, the network may also update the RLC entities configured to support OOD. A MAC CE may be used to align the OOD configuration (e.g., the association of RLC entities and/or DRB configuration) in a timely manner. When multiple levels of associations apply for the treatment of a packet, the network may define a rule to determine which association is considered first and which second (e.g., primary and secondary).

The general signaling framework for doing so may be as follows. The network may initially configure whether transmission/reception on a DRB or RLC entity may have delivery mode behavior. This could be a binary or 1-bit flag indication in the PDCP configuration information (e.g., a pdcp-config IE). The network may further configure the "initial state" of the delivery mode behavior of the DRB or RLC entity. This may indicate the conditions for the PDCP entity to submit PDCP PDUs/SDUs from and trigger delivery to upper layers, starting from either an immediate PDU set or the following PDU set. The network may dynamically switch the state of delivery mode behavior of the DRB or RLC entity using a MAC CE or another type of information.

Figure 11:
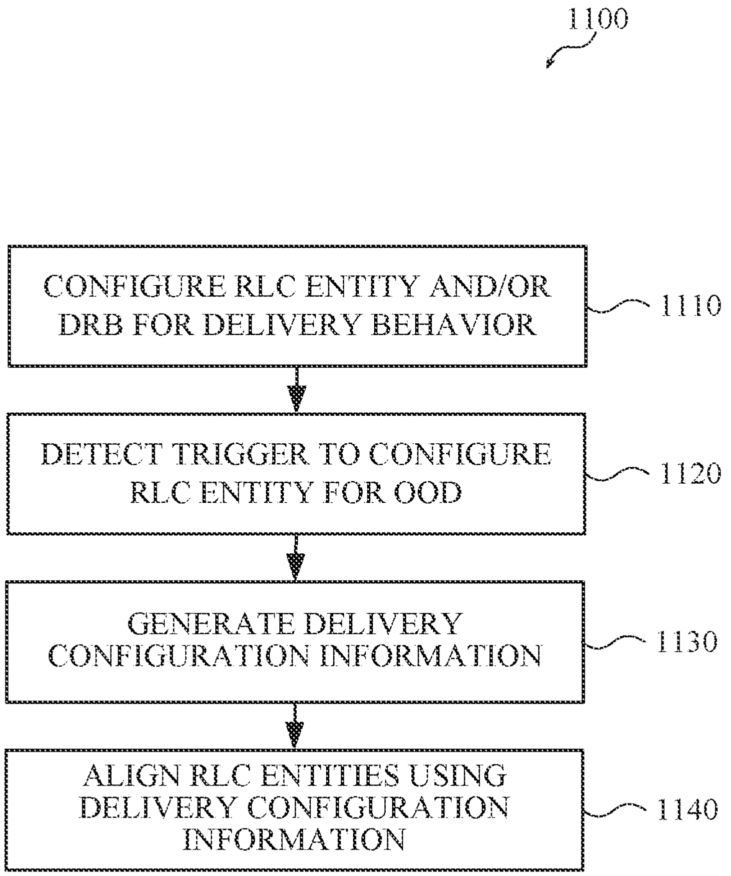
FIG. 11 is a diagram of an example of a process for dynamically configuring an RLC entity for OOD according to one or more implementations described herein.

FIG. 11 is a diagram of an example of a process 1100 for dynamically configuring an RLC entity for OOD according to one or more implementations described herein. Process 1100 may be performed by base station 122. In some implementations, some or all of process 1100 may be performed by one or more other systems or devices, including one or more of the devices of FIG. 1, such as UE 110 and/or a function of CN 130. Additionally, process 1100 may include one or more fewer, additional, differently ordered and/or arranged operations than those shown in FIG. 11. In some implementations, some or all of the operations of process 1100 may be performed independently, successively, simultaneously, etc., of one or more of the other operations of process 1100. As such, the techniques described herein are not limited to a number, sequence, arrangement, timing, etc., of the operations or process depicted in FIG. 11.

Process 1100 may include configuring an RLC entity and/or DRB for delivery behavior (block 1110). For example, base station 122 may create an RLC entity and/or DRB. In doing so, base station 122 may whether the RLC entity and/or DRB may engage in delivery mode behavior (e.g., whether the RLC entity and/or DRB may transition between in-order delivery and OOD).

Process 1100 may include detecting a trigger to configure an RLC entity for OOD (block 1120). For example, base station 122 may detect a trigger to configure or reconfigure an RLC entity for OOD. The trigger may include a change in a PDCP duplication policy, a change in how PDUs or PDU sets are treated over the radio interface, a newly detected QoS flow, the creation of a new RLC entity or DRB, etc. For example, an RLC entity may be used with PDCP duplication and changing the PDCP duplication policy may trigger the activation, deactivation, or reconfiguration of one or more RLC entities.

Process 1100 may include generating delivery configuration information (block 1130). For example, in response to detecting the trigger, base station 122 may generate delivery configuration information. The delivery configuration information may include rules and instructions for configuring or reconfiguring a new or existing RLC entity. In some implementations, base station 122 may apply one or more rules for reconfiguring multiple levels of associations according to models 3A or 3B of FIG. 3. As described below with reference to FIGS. 12-13, the configuration information may include a bit map indicating a delivery mode for an RLC entity and/or DRB.

Process 1100 may include aligning RLC entities using delivery configuration information (block 1140). For example, base station 122 may align one or more RLC entities bases on the delivery configuration information. Base station 122 may also, or alternatively, send the delivery configuration information to UE 110, which may cause UE 110 to align RLC entities at base station 110 with RLC entities at UE 110.

Figure 12:
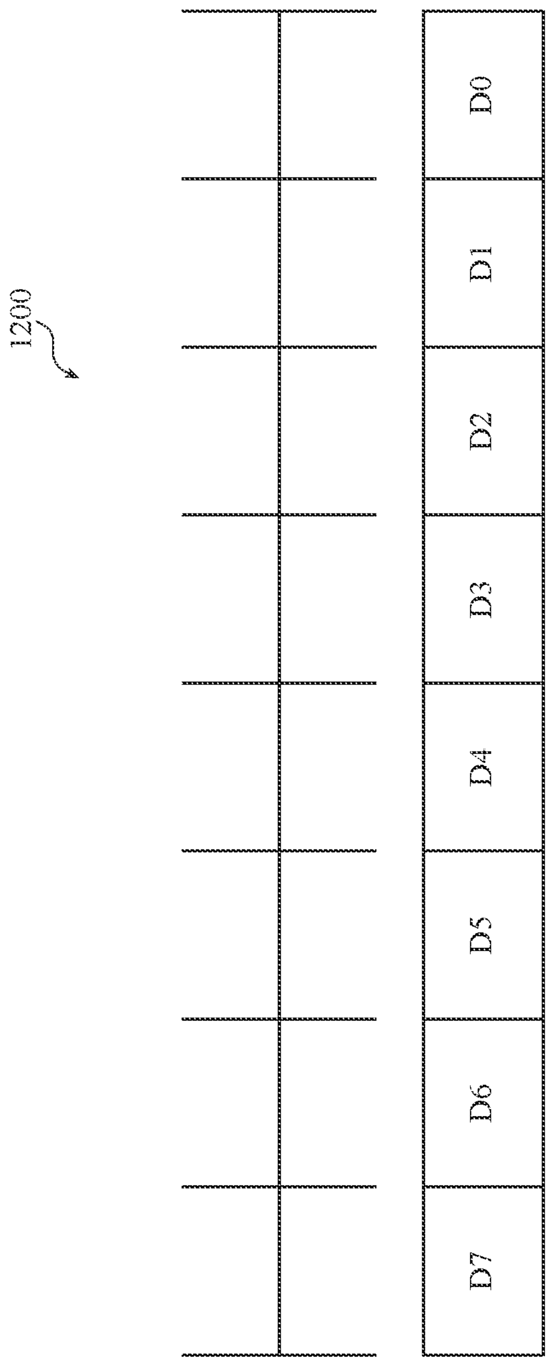
FIGS. 12-13 are diagrams of examples of bitmaps for configuring or reconfiguring RLC entities according to one or more implementations described herein.
Figure 13:
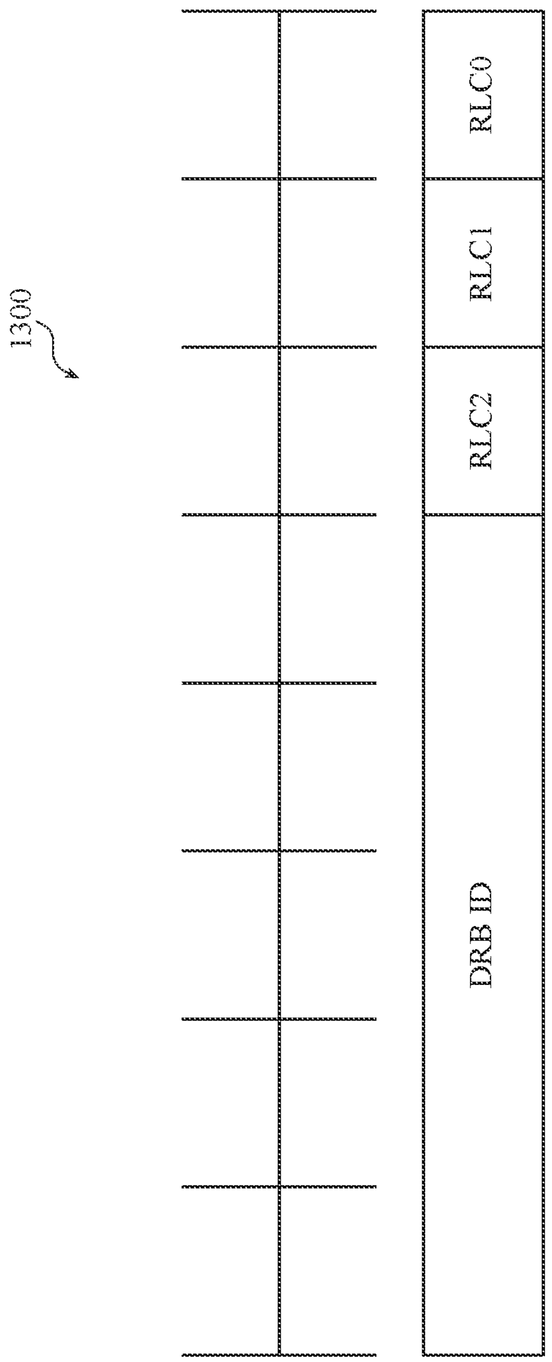

FIGS. 12-13 are diagrams of examples of bitmaps 1200 and 1300 for configuring or reconfiguring RLC entities according to one or more implementations described herein. Referring to FIG. 12, bitmap 1200 may include an octet of bits where each bit represents a DRB, and a value of 0 or 1 indicates whether selective OOD (or per-packet ODD) should be activated or de-activated for the corresponding DRB. The corresponding MAC CE may include one or more DRB IDs, which correspond to the DRBs for which base station 122 may activate or deactivate selective OOD. Thus, the MAC CE may include one or more DRB IDs and one or more bitmaps 1200 corresponding thereto.

Referring to FIG. 13, bitmap 1300 includes a DRB ID portion and corresponding RLCi portion (e.g., RLC0, RLC1, etc.), which may indicate an activation/deactivation status of a PDCP delivery mode for each entity where i is ascending order of logical channel ID of secondary RLC entities in the order of MCG and SCG, for the DRB. The RLC1 field may be set to either 1 or 0 to indicate whether OOD is active for the corresponding RLC entity i. The DRB ID portion may be 5 bits of an octet and the DRB ID may be 3 bits of the octet. The corresponding MAC CE may be identified by a MAC sub-header with an extended logical channel ID (eLCID) or a normal logical channel ID (LCID).

Figure 14:
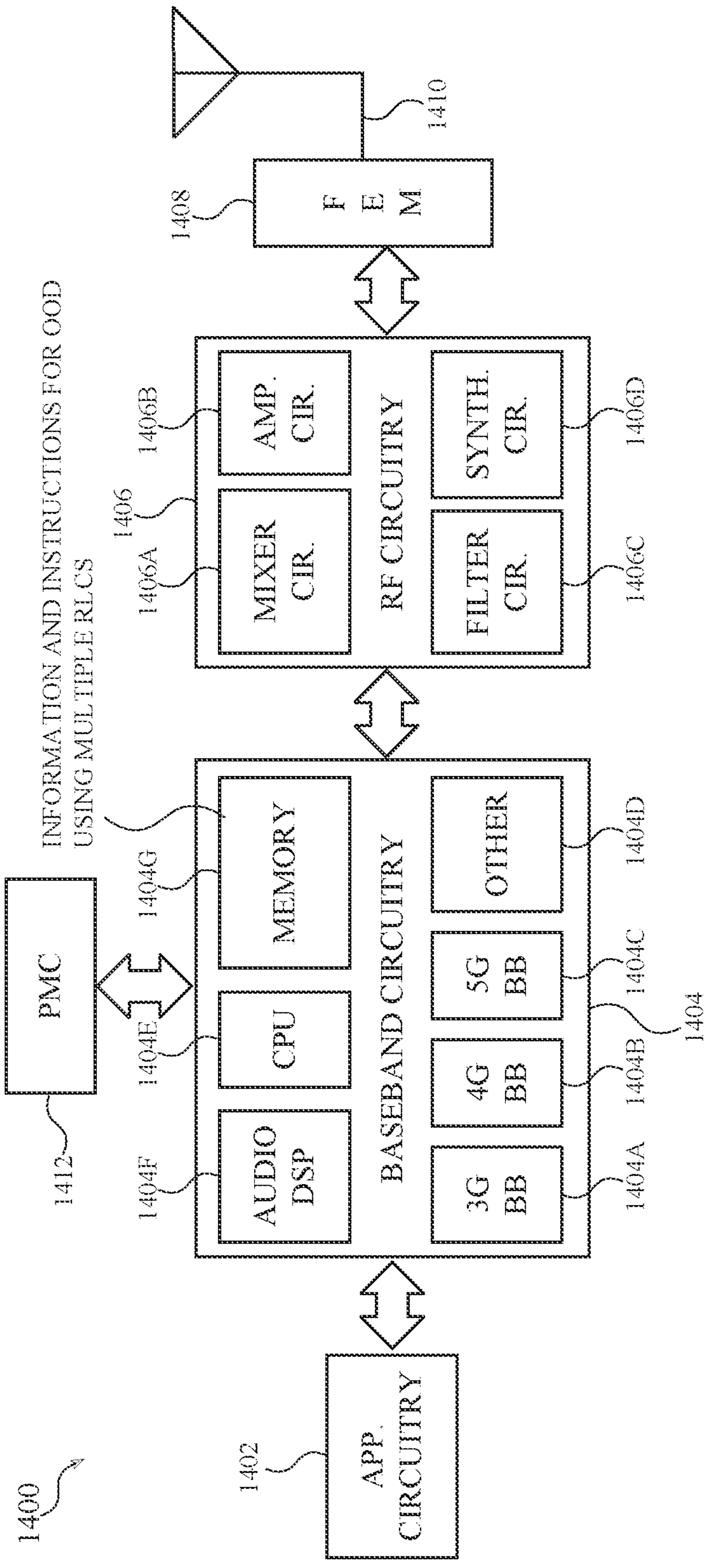
FIG. 14 is a diagram of an example of components of a device according to one or more implementations described herein.

FIG. 14 is a diagram of an example of components of a device according to one or more implementations described herein. In some implementations, the device 1400 can include application circuitry 1402, baseband circuitry 1404, RF circuitry 1406, front-end module (FEM) circuitry 1408, one or more antennas 1410, and power management circuitry (PMC) 1412 coupled together at least as shown. The components of the illustrated device 1400 can be included in a UE or a RAN node. In some implementations, the device 1400 can include fewer elements (e.g., a RAN node may not utilize application circuitry 1402, and instead include a processor/controller to process IP data received from a CN or an Evolved Packet Core (EPC)). In some implementations, the device 1400 can include additional elements such as, for example, memory/storage, display, camera, sensor (including one or more temperature sensors, such as a single temperature sensor, a plurality of temperature sensors at different locations in device 1400, etc.), or input/output (I/O) interface. In other implementations, the components described below can be included in more than one device (e.g., said circuitries can be separately included in more than one device for Cloud-RAN (C-RAN) implementations).

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1400. In some implementations, processors of application circuitry 1402 can process IP data packets received from an EPC.

The baseband circuitry 1404 can include circuitry such as, but not limited to, one or more single-core or multi-core processors. The baseband circuitry 1404 can include one or more baseband processors or control logic to process baseband signals received from a receive signal path of the RF circuitry 1406 and to generate baseband signals for a transmit signal path of the RF circuitry 1406. Baseband circuitry 1404 can interface with the application circuitry 1402 for generation and processing of the baseband signals and for controlling operations of the RF circuitry 1406. For example, in some implementations, the baseband circuitry 1404 can include a 3G baseband processor 1404A, a 4G baseband processor 1404B, a 5G baseband processor 1404C, or other baseband processor(s) 1404D for other existing generations, generations in development or to be developed in the future (e.g., 5G, 6G, etc.). The baseband circuitry 1404 (e.g., one or more of baseband processors 1404A-D) can handle various radio control functions that enable communication with one or more radio networks via the RF circuitry 1406. In other implementations, some or all of the functionality of baseband processors 1404A-D can be included in modules stored in the memory 1404G and executed via a Central Processing Unit (CPU) 1404E. The radio control functions can include, but are not limited to, signal modulation/demodulation, encoding/decoding, radio frequency shifting, etc. In some implementations, modulation/demodulation circuitry of the baseband circuitry 1404 can include Fast-Fourier Transform (FFT), precoding, or constellation mapping/de-mapping functionality. In some implementations, encoding/decoding circuitry of the baseband circuitry 1404 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1404G may receive and/or store information and instructions for communicating and receiving, via a wireless communication network, information as in-order traffic using an in-order RLC entity; and communicating and receiving, via the wireless communication network, information as out-of-order traffic using an out-of-order RLC entity. The in-order traffic and the out-of-order traffic may be communicated using the same DRB. The out-of-order traffic may include selective OOD or per-packet OOD. Additional examples and features are also described herein.

In some implementations, the baseband circuitry 1404 can include one or more audio digital signal processor(s) (DSP) 1404F. The audio DSPs 1404F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1404 and the application circuitry 1402 can be implemented together such as, for example, on a system on a chip (SOC).

In some implementations, the baseband circuitry 1404 can provide for communication compatible with one or more radio technologies. For example, in some implementations, the baseband circuitry 1404 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various implementations, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some implementations, the receive signal path of the RF circuitry 1406 can include mixer circuitry 1406A, amplifier circuitry 1406B and filter circuitry 1406C. In some implementations, the transmit signal path of the RF circuitry 1406 can include filter circuitry 1406C and mixer circuitry 1406A. RF circuitry 1406 can also include synthesizer circuitry 1406D for synthesizing a frequency for use by the mixer circuitry 1406A of the receive signal path and the transmit signal path. In some implementations, the mixer circuitry 1406A of the receive signal path can be configured to down-convert RF signals received from the FEM circuitry 1408 based on the synthesized frequency provided by synthesizer circuitry 1406D. The amplifier circuitry 1406B can be configured to amplify the down-converted signals and the filter circuitry 1406C can be a low-pass filter (LPF) or band-pass filter (BPF) configured to remove unwanted signals from the down-converted signals to generate output baseband signals. Output baseband signals can be provided to the baseband circuitry 1404 for further processing. In some implementations, the output baseband signals can be zero-frequency baseband signals, although this is not a requirement. In some implementations, mixer circuitry 1406A of the receive signal path can comprise passive mixers, although the scope of the implementations is not limited in this respect.

In some implementations, the mixer circuitry 1406A of the transmit signal path can be configured to up-convert input baseband signals based on the synthesized frequency provided by the synthesizer circuitry 1406D to generate RF output signals for the FEM circuitry 1408. The baseband signals can be provided by the baseband circuitry 1404 and can be filtered by filter circuitry 1406C.

In some implementations, the mixer circuitry 1406A of the receive signal path and the mixer circuitry 1406A of the transmit signal path can include two or more mixers and can be arranged for quadrature down conversion and up conversion, respectively. In some implementations, the mixer circuitry 1406A of the receive signal path and the mixer circuitry 1406A of the transmit signal path can include two or more mixers and can be arranged for image rejection (e.g., Hartley image rejection). In some implementations, the mixer circuitry 1406A of the receive signal path and the mixer circuitry 1406A can be arranged for direct down conversion and direct up conversion, respectively. In some implementations, the mixer circuitry 1406A of the receive signal path and the mixer circuitry 1406A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode implementations, a separate radio IC circuitry can be provided for processing signals for each spectrum, although the scope of the implementations is not limited in this respect.

In some implementations, the synthesizer circuitry 1406D can be a fractional-N synthesizer or a fractional N/N+1 synthesizer, although the scope of the implementations is not limited in this respect as other types of frequency synthesizers can be suitable. For example, synthesizer circuitry 1406D can be a delta-sigma synthesizer, a frequency multiplier, or a synthesizer comprising a phase-locked loop with a frequency divider.

The synthesizer circuitry 1406D can be configured to synthesize an output frequency for use by the mixer circuitry 1406A of the RF circuitry 1406 based on a frequency input and a divider control input. In some implementations, the synthesizer circuitry 1406D can be a fractional N/N+1 synthesizer.

In some implementations, frequency input can be provided by a voltage-controlled oscillator (VCO), although that is not a requirement. Divider control input can be provided by either the baseband circuitry 1404 or the applications circuitry 1402 depending on the desired output frequency. In some implementations, a divider control input (e.g., N) can be determined from a look-up table based on a channel indicated by the applications circuitry 1402.

Synthesizer circuitry 1406D of the RF circuitry 1406 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1406D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410. In various implementations, the amplification through the transmit or receive signal paths can be done solely in the RF circuitry 1406, solely in the FEM circuitry 1408, or in both the RF circuitry 1406 and the FEM circuitry 1408.

In some implementations, the FEM circuitry 1408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410).

In some implementations, the PMC 1412 can manage power provided to the baseband circuitry 1404. In particular, the PMC 1412 can control power-source selection, voltage scaling, battery charging, or DC-to-DC conversion. The PMC 1412 can often be included when the device 1400 is capable of being powered by a battery, for example, when the device is included in a UE. The PMC 1412 can increase the power conversion efficiency while providing desirable implementation size and heat dissipation characteristics.

While FIG. 14 shows the PMC 1412 coupled only with the baseband circuitry 1404. However, in other implementations, the PMC 1412 may be additionally or alternatively coupled with, and perform similar power management operations for, other components such as, but not limited to, application circuitry 1402, RF circuitry 1406, or FEM circuitry 1408.

In some implementations, the PMC 1412 can control, or otherwise be part of, various power saving mechanisms of the device 1400. For example, if the device 1400 is in an RRC_Connected state, where it is still connected to the RAN node as it expects to receive traffic shortly, then it can enter a state known as Discontinuous Reception Mode (DRX) after a period of inactivity. During this state, the device 1400 can power down for brief intervals of time and thus save power.

If there is no data traffic activity for an extended period of time, then the device 1400 can transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1402 and processors of the baseband circuitry 1404 can be used to execute elements of one or more instances of a protocol stack. For example, processors of the baseband circuitry 1404, alone or in combination, can be used execute Layer 3, Layer 2, or Layer 1 functionality, while processors of the baseband circuitry 1404 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 15:
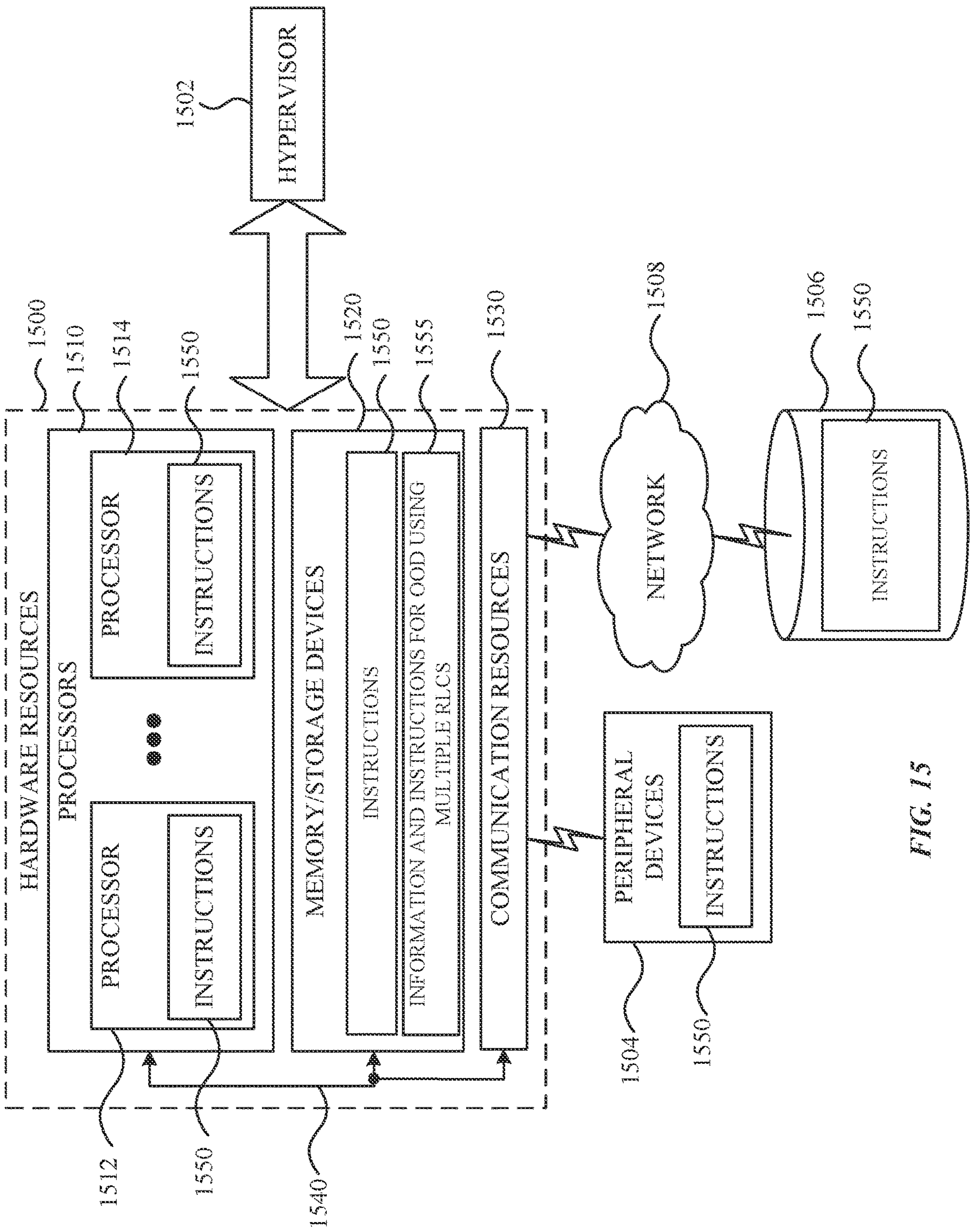
FIG. 15 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 15 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which may be communicatively coupled via a bus 1540. For implementations where node virtualization (e.g., NFV) is utilized, a hypervisor 1502 may be executed to provide an execution environment for one or more network slices/sub-slices to utilize the hardware resources 1500.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514.

The memory/storage devices 1520 may include main memory, disk storage, or any suitable combination thereof. The memory/storage devices 1520 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1520 receive and/or store information and instructions 1555 for communicating and receiving, via a wireless communication network, information as in-order traffic using an in-order RLC entity; and communicating and receiving, via the wireless communication network, information as out-of-order traffic using an out-of-order RLC entity. The in-order traffic and the out-of-order traffic may be communicated using the same DRB. The out-of-order traffic may include selective OOD or per-packet OOD. Additional examples and features are also described herein.

The communication resources 1530 may include interconnection or network interface components or other suitable devices to communicate with one or more peripheral devices 1504 or one or more databases 1506 via a network 1508. For example, the communication resources 1530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 or the databases 1506. Accordingly, the memory of processors 1510, the memory/storage devices 1520, the peripheral devices 1504, and the databases 1506 are examples of computer-readable and machine-readable media.

acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a device, comprising: a memory; and one or more processors configured to, when executing instructions stored in the memory, cause the device to: communicate, via a wireless communication network, information as in-order traffic using an in-order radio link control (RLC) entity; and communicate, via the wireless communication network, information as out-of-order traffic using an out-of-order RLC entity, wherein: the in-order traffic and the out-of-order traffic are communicated using a same data radio bearer (DRB), and the out-of-order traffic comprises selective out-of-order delivery (OOD) or per-packet OOD.

In example 2, which may also include one or more of the examples described herein, selective OOD comprises OOD for a quality of service (QOS) flow, a packet data unit (PDU) set, or a PDU set type, and per-packet OOD comprises OOD for packets indicating OOD.

In example 3, which may also include one or more of the examples described herein, radio resource control (RRC) is used to configure a packet data convergence protocol (PDCP) entity with one or multiple associated RLC entities.

In example 4, which may also include one or more of the examples described herein, radio resource control (RRC) is used to configure a PDCP entity to process the in-order traffic and out-of-order traffic in accordance with a corresponding delivery mode.

In example 5, which may also include one or more of the examples described herein, a packet data convergence protocol (PDCP) entity of the device is associated with the in-order RLC entity and the out-of-order RLC entity.

In example 6, which may also include one or more of the examples described herein, the out-of-order RLC entity comprises an RLC entity of a subset of RLC entities.

In example 7, which may also include one or more of the examples described herein, the in-order RLC entity and the out-of-order RLC entity correspond to a receiving in-order RLC entity and a receiving out-of-order RLC entity of a receiving device.

In example 8, which may also include one or more of the examples described herein, in-order traffic and out-of-order traffic are transmitted according to a sequence ordering characteristic received by upper layers.

In example 9, which may also include one or more of the examples described herein, a PDCP entity, an in-order RLC entity associated with the PDCP entity, and the out-of-order RLC entity are configured in accordance with user equipment (UE) assistance information (UAI) indicating a preference for in-order traffic or out-of-order traffic.

In example 10, which may also include one or more of the examples described herein, the in-order RLC entity and the out-of-order RLC entity are dynamically configured by the wireless communications network.

In example 11, which may also include one or more of the examples described herein, the in-order RLC entity and the out-of-order RLC entity are dynamically activated or deactivated by the wireless communications network.

In example 12, which may also include one or more of the examples described herein, a device, comprising: a memory; and one or more processors configured to, when executing instructions stored in the memory, cause the device to: receive, via a wireless communication network, information as in-order traffic using an in-order radio link control (RLC) entity; and receive, via the wireless communication network, information as out-of-order traffic using an out-of-order RLC entity, wherein: the in-order traffic and the out-of-order traffic are communicated using the same data radio bearer (DRB), and the out-of-order traffic comprises selective out-of-order delivery (OOD) or per-packet OOD. In example 13, which may also include one or more of the examples described herein.

In example 14, which may also include one or more of the examples described herein, selective OOD comprises OOD for a quality of service (QOS) flow, a packet data unit (PDU) set, or a PDU set type, and per-packet OOD comprises OOD for packets indicating OOD.

In example 15, which may also include one or more of the examples described herein, radio resource control (RRC) is used to configure the in-order RLC entity and the out-of-order RLC entity.

In example 16, which may also include one or more of the examples described herein, a packet data convergence protocol (PDCP) entity of the device is associated with the in-order RLC entity and the out-of-order RLC entity.

In example 17, which may also include one or more of the examples described herein, the PDCP entity is configured to switch between in-order delivery and OOD based on whether traffic is received from the in-order RLC entity and the out-of-order RLC entity.

In example 18, which may also include one or more of the examples described herein, the out-of-order RLC entity comprises an RLC entity of a subset of RLC entities.

In example 19, which may also include one or more of the examples described herein, the in-order RLC entity and the out-of-order RLC entity correspond to a transmitting in-order RLC entity and a transmitting out-of-order RLC entity of a transmitting device.

In example 20, which may also include one or more of the examples described herein, the in-order RLC entity and the out-of-order RLC entity are configured in accordance with user equipment (UE) assistance information (UAI) indicating a preference for in-order traffic or out-of-order traffic.

In example 21, which may also include one or more of the examples described herein, the in-order RLC entity and the out-of-order RLC entity are dynamically configured by the wireless communications network.

In example 22, which may also include one or more of the examples described herein, the in-order RLC entity and the out-of-order RLC entity are dynamically activated or deactivated by the wireless communications network.

In example 23, which may also include one or more of the examples described herein, a method, performed by a device, the method comprising: receiving, via a wireless communication network, information as in-order traffic using an in-order radio link control (RLC) entity; and receiving, via the wireless communication network, information as out-of-order traffic using an out-of-order RLC entity, wherein: the in-order traffic and the out-of-order traffic are communicated using the same data radio bearer (DRB), and the out-of-order traffic comprises selective out-of-order delivery (OOD) or per-packet OOD.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:

1. A baseband processor, comprising:
one or more processors configured to:
provide User Equipment (UE) preference or capability information indicating a preference or capability of the UE to communicate information as out-of-order traffic;
receive an out-of-order delivery (OOD) configuration for a first radio link control (RLC) entity, wherein the OOD configuration configures an in-order delivery mode as an initial delivery mode of the first RLC entity;
communicate, based on the OOD configuration, information as in-order traffic using the first RLC entity;
receive a medium access control (MAC) control element (CE) to dynamically switch the first RLC entity from the in-order delivery mode to an out-of-order delivery mode; and
communicate, based on the OOD configuration and the MAC CE, information as out-of-order traffic using the first RLC entity.

2. The baseband processor of claim 1, wherein the out-of-order traffic comprises selective OOD or per-packet OOD, wherein selective OOD comprises OOD for a quality of service (QoS) flow, a packet data unit (PDU) set, or a PDU set type, and wherein per-packet OOD comprises OOD for packets indicating OOD.

3. The baseband processor of claim 1, wherein the one or more processors are further configured to:
communicate in-order traffic and out-of-order traffic using different RLC entities and a same data radio bearer (DRB).

4. The baseband processor of claim 1, wherein the one or more processors are further configured to:
receive a radio resource control (RRC) message to configure a packet data convergence protocol (PDCP) entity with one or multiple associated RLC entities.

5. The baseband processor of claim 1, wherein the one or more processors are further configured to:
receive a radio resource control (RRC) message to configure a PDCP entity to process the in-order traffic and out-of-order traffic in accordance with a corresponding delivery mode.

6. The baseband processor of claim 1, wherein a packet data convergence protocol (PDCP) entity of the UE is associated with an in-order RLC entity and an out-of-order RLC entity.

7. The baseband processor of claim 1, wherein the one or more processors are further configured to:
receive a configuration of a subset of RLC entities for communicating out-of-order traffic.

8. The baseband processor of claim 1, wherein in-order traffic and out-of-order traffic are transmitted according to a sequence ordering characteristic received by upper layers.

9. The baseband processor of claim 1, wherein the OOD configuration includes a delivery mode behavior indication indicating that the first RLC entity supports transition between the in-order delivery mode and the out-of-order delivery mode.

10. The baseband processor of claim 9, wherein the delivery mode behavior indication is included in a packet data convergence protocol (PDCP) configuration.

11. A method for a base station, comprising:

receiving User Equipment (UE) preference or capability information indicating a preference or capability of the UE to communicate information as out-of-order traffic;

transmitting, to the UE, an out-of-order delivery (OOD) configuration for a first radio link control (RLC) entity based on the UE preference or capability information, wherein the OOD configuration configures an in-order delivery mode as an initial delivery mode of the first RLC entity;

communicating, based on the OOD configuration, information as in-order traffic using the first RLC entity;

transmitting a medium access control (MAC) control element (CE) to dynamically switch the first RLC entity from the in-order delivery mode to an out-of-order delivery mode; and communicating, based on the OOD configuration and the MAC CE, information as out-of-order traffic using the first RLC entity.

12. The method of claim 11, wherein the out-of-order traffic comprises selective OOD or per-packet OOD, wherein selective OOD comprises OOD for a quality of service (QoS) flow, a packet data unit (PDU) set, or a PDU set type, and per-packet OOD comprises OOD for packets indicating OOD.

13. The method of claim 11, further comprising:

transmitting a resource control (RRC) message to the UE to configure separate RLC entities for communicating in-order and out-of-order traffic.

14. The method of claim 13, wherein a packet data convergence protocol (PDCP) entity of the base station is associated with the separate in-order and out-of-order RLC entities.

15. The method of claim 14, wherein the PDCP entity is configured to switch between in-order delivery and out-of-order delivery based on whether traffic is received from the in-order RLC entity and the out-of-order RLC entity.

16. The method of claim 13, wherein the in-order RLC entity and the out-of-order RLC entity correspond to a transmitting in-order RLC entity and a transmitting out-of-order RLC entity of the UE.

17. The method of claim 13, wherein the in-order RLC entity and the out-of-order RLC entity are configured in accordance with user equipment (UE) assistance information (UAI) indicating a preference for in-order traffic or out-of-order traffic.

18. The method of claim 11, further comprising:

transmitting a configuration of a subset of RLC entities for communicating out-of-order traffic.

19. The method of claim 11, further comprising:

communicating in-order traffic and out-of-order traffic using different RLC entities and a same data radio bearer (DRB).

20. A User Equipment (UE), comprising:

a memory;

radio front end circuitry; and processor circuitry, coupled to the radio front end circuitry and the memory, the processor circuitry configured to execute instructions stored in the memory to cause the UE to:

transmit User Equipment (UE) preference or capability information indicating a preference or capability of the UE to communicate information as out-of-order traffic;

receive an out-of-order delivery (OOD) configuration for a first radio link control (RLC) entity, wherein the OOD configuration configures an in-order delivery mode as an initial delivery mode of the first RLC entity;

communicate, based on the OOD configuration, information as in-order traffic using the first RLC entity;

receive a medium access control (MAC) control element (CE) to dynamically switch the first RLC entity from the in-order delivery mode to an out-of-order delivery mode; and communicate, based on the OOD configuration and the MAC CE, information as out-of-order traffic using the first RLC entity.

* * * * *